(12) United States Patent
Jiang

(10) Patent No.: US 12,044,267 B2
(45) Date of Patent: Jul. 23, 2024

(54) COUPLING STRUCTURE FOR BOARD ASSEMBLY

(71) Applicant: YIXIANG BLOW MOLDING FURNITURE CO., LTD., Yuyao (CN)

(72) Inventor: Jinglei Jiang, Yuyao (CN)

(73) Assignee: YIXIANG BLOW MOLDING FURNITURE CO., LTD., Yuyao (CN)

( * ) Notice: Subject to any disclaimer, the term of this patent is extended or adjusted under 35 U.S.C. 154(b) by 0 days.

(21) Appl. No.: 17/553,534

(22) Filed: Dec. 16, 2021

(65) Prior Publication Data

US 2023/0123650 A1  Apr. 20, 2023

(51) Int. Cl.
*F16B 5/00* (2006.01)

(52) U.S. Cl.
CPC ........ F16B 5/0052 (2013.01); *F16B 2200/30* (2018.08)

(58) Field of Classification Search
CPC .......... A47B 2230/0077; A63H 33/082; A63H 33/105; E04B 1/6137; E04B 1/6158; E04B 2001/5881; E04B 2001/5893; F16B 5/0012; F16B 5/0016; F16B 5/0036; F16B 5/0044; F16B 5/0052; F16B 2200/30; F16S 1/02; Y10T 403/70; Y10T 403/7045; Y10T 403/7094

USPC .......................................................... 428/57
See application file for complete search history.

(56) References Cited

U.S. PATENT DOCUMENTS

| 9,598,856 | B2 * | 3/2017 | Schulte | F16B 5/07 |
| 10,072,687 | B2 * | 9/2018 | Jiang | F16B 5/0036 |
| 10,086,304 | B1 * | 10/2018 | LaChance, III | A63H 33/105 |

FOREIGN PATENT DOCUMENTS

| DE | 202016102380 U1 * | 9/2017 | ............ F16B 5/0052 |
| FR | 2761123 A1 * | 9/1998 | ............ F16B 5/0052 |
| WO | WO-9504228 A1 * | 2/1995 | ............ F16B 5/0052 |

* cited by examiner

*Primary Examiner* — Josh Skroupa
(74) *Attorney, Agent, or Firm* — Platinum Intellectual Property PC (57) ABSTRACT

A board coupling structure with a first board and a second board. The first board and the second board are respectively formed with strip-shaped ribs and strip-shaped grooves that can be interlocked with each other. The strip-shaped rib can comprise at least one longitudinally extending arm and one or more transversely extending arms. In particular, the one or more spaced apart transversely extending arms can increase the contact surface of the strip-shaped rib and the strip-shaped groove. Moreover, the connected boards do not need connectors.

4 Claims, 11 Drawing Sheets

COUPLING STRUCTURE FOR BOARD ASSEMBLY

CROSS-REFERENCES TO RELATED APPLICATIONS

This application claims the priority of CN Patent Application No. CN2021112372255, entitled "COUPLING STRUCTURE FOR BOARD ASSEMBLY," filed Oct. 20, 2021, which is incorporated herein by reference for all purposes.

TECHNICAL FIELD

The present subject matter is in the field of board construction. More particularly, embodiments of the present subject matter relate to a screw-free, plug-in connection structure for plastic boards.

BACKGROUND

Many existing of furniture are constructed by assembling multiple boards. In the assembly process of these furniture, screws are often required to connect and fix the boards, which is troublesome to install. For example, take the cabinet structure as an example: when assembling the cabinet, people often need to use a screw driver to install and fix the screws and other connectors on the bottom board, four side boards and cover board, so that the bottom board, side board and cover board can be put together. The process is not only time-consuming and laborious but also has low efficiency.

In addition, when disassembling the cabinet, the screws must be removed one by one, which is also inconvenient. Moreover, when the cabinet is connected and fixed with screws, it is often necessary to reserve mounting holes on the boards when manufacturing them. For precise assembly, the position of these reserved mounting holes must be accurate. Otherwise, it would cause installation failure.

Even more, some cabinets are equipped with embedded connectors in the reserved mounting holes. These embedded parts are often manually installed, resulting in low efficiency. Although the prior art has disclosed the plug-in structure with improved efficiency, the bite of these plug-in structures is low, and the structural reliability and stability need to be further improved. In addition, the contact area of the joint is not large enough, resulting in poor waterproof ability. In summary, the existing board connection structure needs to be further improved.

SUMMARY OF THE INVENTION

The present subject matter can solve the technical problem as described herein by providing a board coupling structure with a reliable structure and optimized stability in view of the present state of the art.

The technical solution of the present subject matter to solve the afore-mentioned technical problems is: a board coupling structure that comprises a first board and a second board each being respectively formed with a strip-shaped rib and a strip-shaped groove that can be inserted into each other, the first board and the second board being only movable relative to each other in the insertion direction, wherein the strip-shaped rib comprises a longitudinally extending arm extending outwards from a circumferential side and a transversely extending arm extending laterally on at least one of the side walls of the longitudinal extending arm; and wherein the strip-shaped groove is disposed on the inner side wall of the second board, and the shape of the strip-shaped groove matches the shape of the strip-shaped rib.

According to some embodiments, the longitudinally extending arm and the circumferential side are perpendicular to each other, and the transversely extending arm and the longitudinally extending arm are perpendicular to each other.

According to some embodiments, one or more transversely extending arms are disposed on the side surfaces of the longitudinally extending arm, and there are at least two transversely extending arms that are spaced apart at intervals. As such, the multiple transversely extending arms can increase the contact area between the strip-shaped rib and the strip-shaped groove, thereby improving the stability and reliability of the board coupling structure. Furthermore, the multi-layer coupling structure can improve the waterproof performance of the board joint.

According to some embodiments, one or more transversely extending arms are disposed on opposite sides of the longitudinally extending arm, and there are at least two transversely extending arms that are spaced apart at intervals. Accordingly, the spaced transversely extending arms on both sides of the longitudinal extension arm can further increase the contact areas between the strip-shaped rib and the strip-shaped groove, thereby further improving the structural stability and waterproof performance of the board coupling structure.

According to some embodiments, the longitudinally extending arm and the transversely extending arm can jointly form a cross-shaped structure. The four different directions of the strip ribs can be engaged with the strip grooves, thereby effectively improving its' structural stability and waterproof performance.

According to some embodiments, the longitudinally extending arm and the transversely extending arm can jointly form a T-shaped structure. As such, the strip-shaped rib and the stripe-shaped groove can be T-shaped, which can be easy to manufacture and facilitate structural stability.

According to some embodiments, the longitudinally extending arm and the transversely extending arm can jointly form an L-shaped structure. The L-shaped structure can have relatively less contact surfaces. Even though the structural stability is relatively low, the L-shaped structure can be easy to manufacture, rendering it suitable for the board connection when structural strength is less demanding.

According to some embodiments, in order to enable the first board and the second board to be inserted and interlocked into each other in place, one end of the strip-shaped groove is formed with an opening, and the other end is closed.

Preferably, the strip-shaped groove can be disposed near the edge of the second board and is disposed along the length direction of the edge.

Preferably, when the first board and the second board are interlocked together, the first board and the second board can be perpendicular to each other. Accordingly, the afore-mentioned plug-in coupling structure can be used between two adjacent boards of a rectangular box, such as a storage box.

Compared with the prior art, the present subject matter has at least the following advantages: the plug-in board coupling structure can adopt an insertion structure comprising a strip-shaped rib and a strip-shaped groove, wherein the strip-shaped rib comprises at least one longitudinally extending arm and one or more transversely extending arms. Particularly, the multiple spaced transversely extending arms can increase the contact surface between the strip rib and the strip groove so that the bite is better, the structure is more stable, and the waterproof performance is optimized.

Moreover, the first board and the second board do not need to be connected by a connector during the installation, which can be convenient and fast. In addition, the plug-in board coupling structure has a wide range of applications, especially for the connection between two adjacent sideboards of the cabinet.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which.

DETAILED DESCRIPTION

The present subject matter pertains to improved approaches for a screw-free and highly stable coupling structure between adjacent boards. Embodiments of the present subject matter are discussed below with reference to FIGS. 1-11.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

Embodiment I

As shown in FIGS. 1 to 5, the board coupling structure of this embodiment can comprise a first board 1 and a second board 2 that can be inserted and interlocked into each other. The first board 1 and the second board 2 can be rectangle or square boards. When they are coupled, the first board 1 and the second board 2 can be perpendicular to each other. According to some embodiments, the first board 1 and the second board 2 can be respectively formed with at least one strip-shaped rib 11 and at least one strip-shaped groove 21 that can be inserted or plug-in into each other, so that the first board 1 and the second board 2 can only move in the insertion direction.

The strip-shaped rib 11 of this embodiment can be disposed on one of the circumferential side surfaces 12 of the first board 1, whereas the strip-shaped groove 21 can be disposed on the inner side wall of the second board 2 and near an edge of the second board (2) along the length direction of the edge. According to some embodiments, the shape of the strip-shaped groove 21 can be adapted to the strip rib 11, with one end of the strip groove 21 forming an opening, and the other end being closed. As such, it can facilitate the insertion of the first board 1 and the second board 2 to form the coupling structure.

According to some embodiments, the circumferential side 12 of the first board 1 can extend outwardly to form a longitudinally extending arm 111 that is perpendicular to the circumferential side 12. In this embodiment, two transversely extending arms 112 can extend laterally on opposite sides of the longitudinally extending arm 111, and the transversely extending arms 112 and the longitudinally extending arm 111 are perpendicular to each other. The longitudinally extending arm 111 and the transversely extending arms 112 can jointly form a strip-shaped rib 11, so that the cross-section of the strip-shaped rib 11 forms a double-T shape. With the double-T shaped cross-section, the contact area between the strip-shaped rib 11 and the stripe-shaped groove 12 is larger. On the one hand, the board coupling structure can improve the bite and make the structure more stable and reliable. On the other hand, it can also facilitate the waterproofing of the connection between the two boards.

Figure 1:
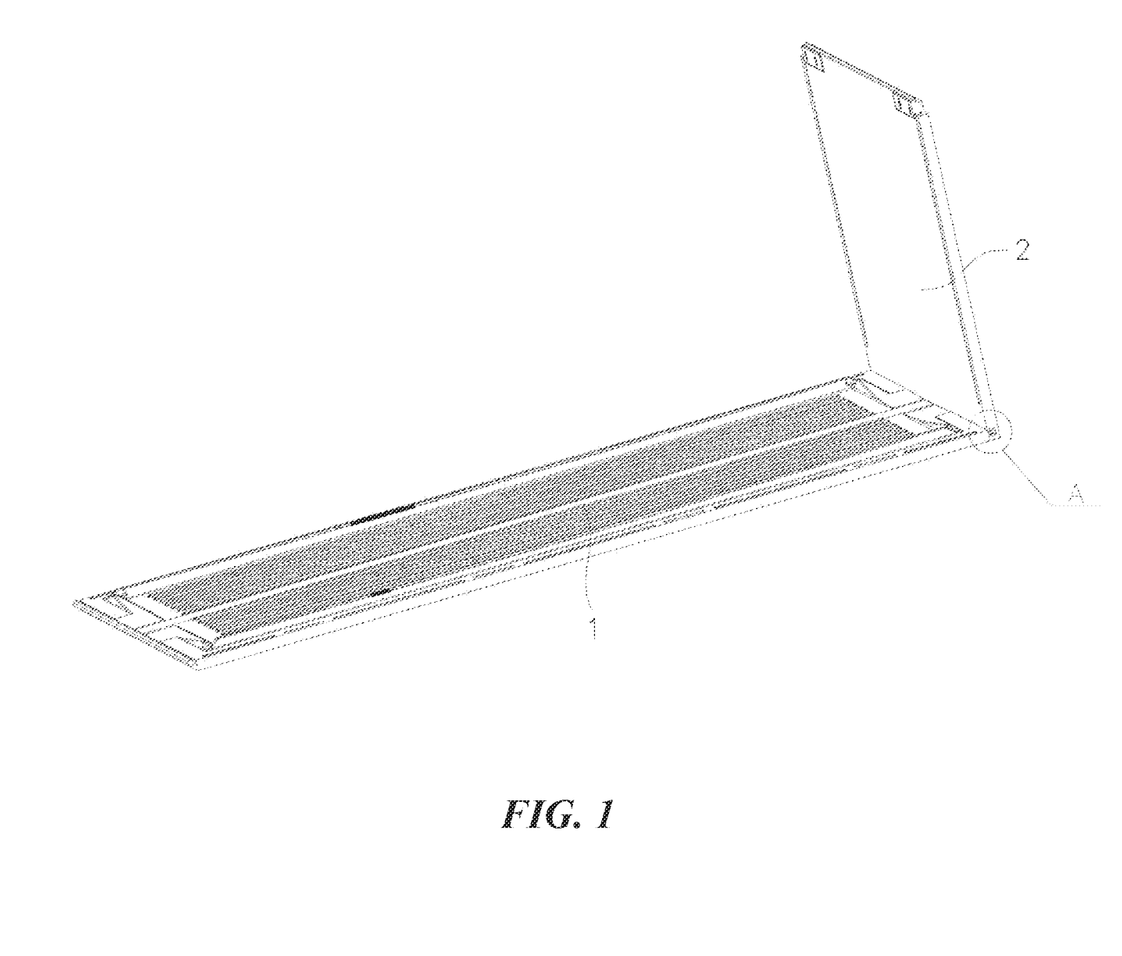
FIG. 1 is a schematic structural diagram of Embodiment I of the present subject matter.
Figure 2:
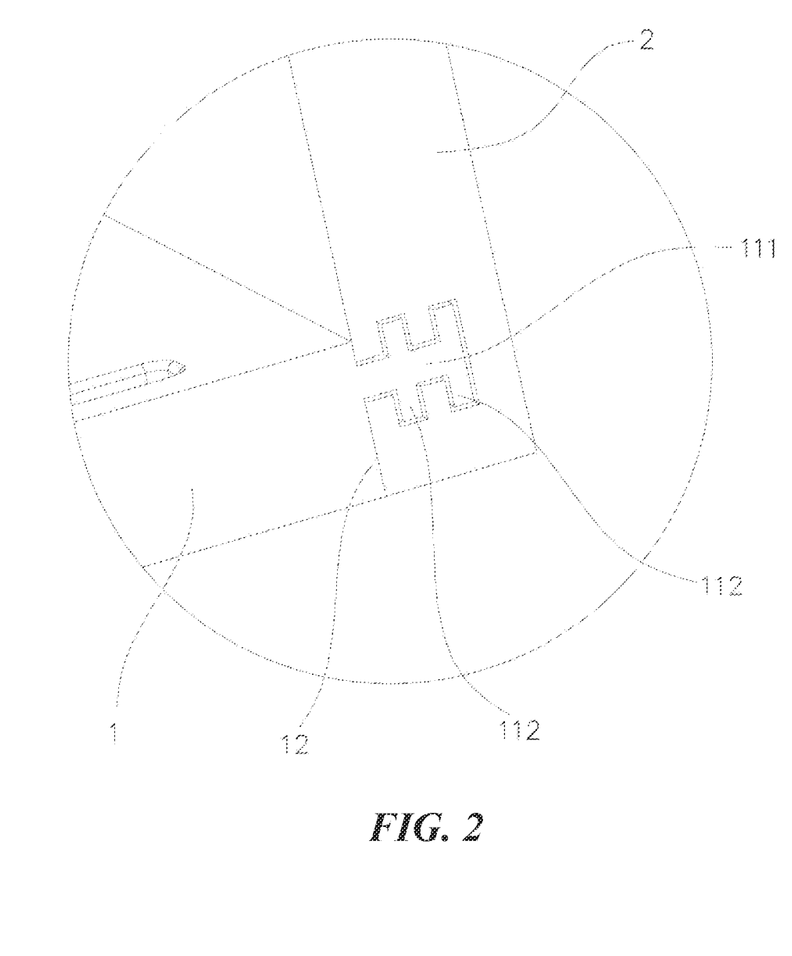
FIG. 2 is an enlarged schematic diagram of part A in FIG. 1.
Figure 3:
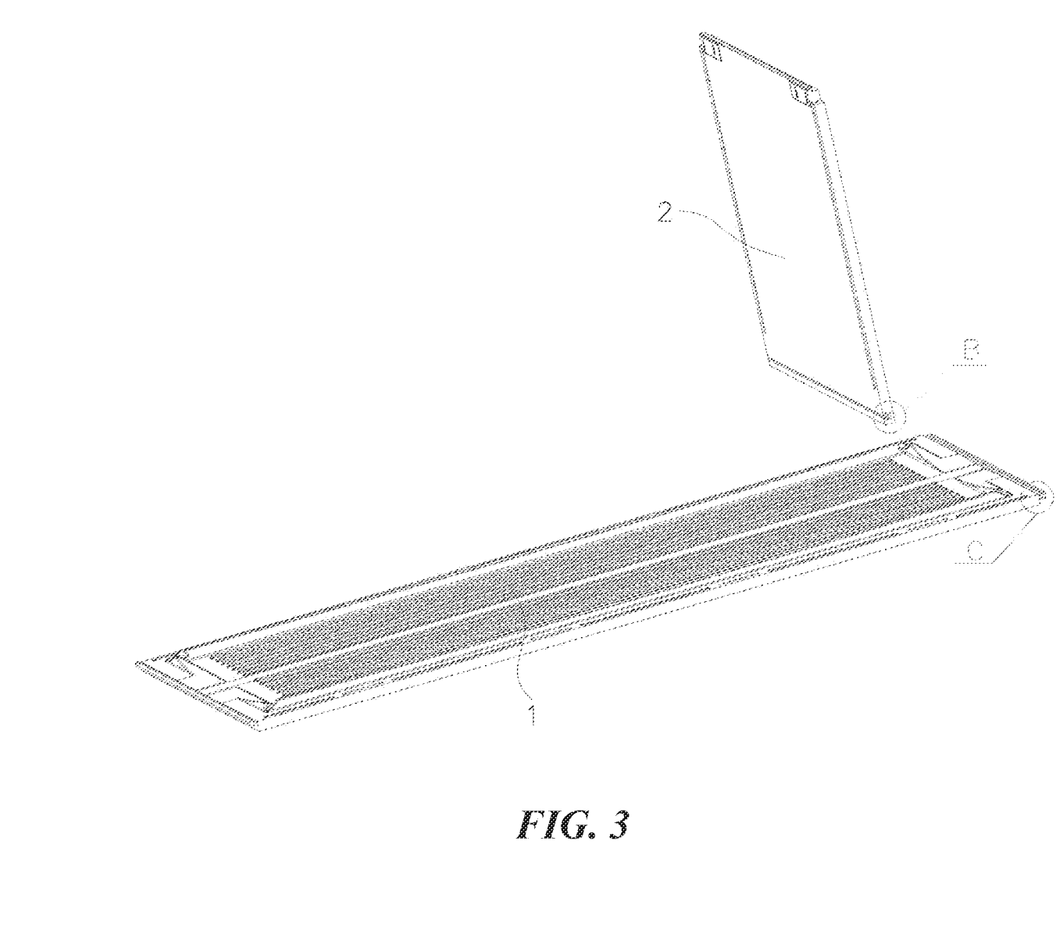
FIG. 3 is an exploded schematic diagram of Embodiment I of the present subject matter.
Figure 4:
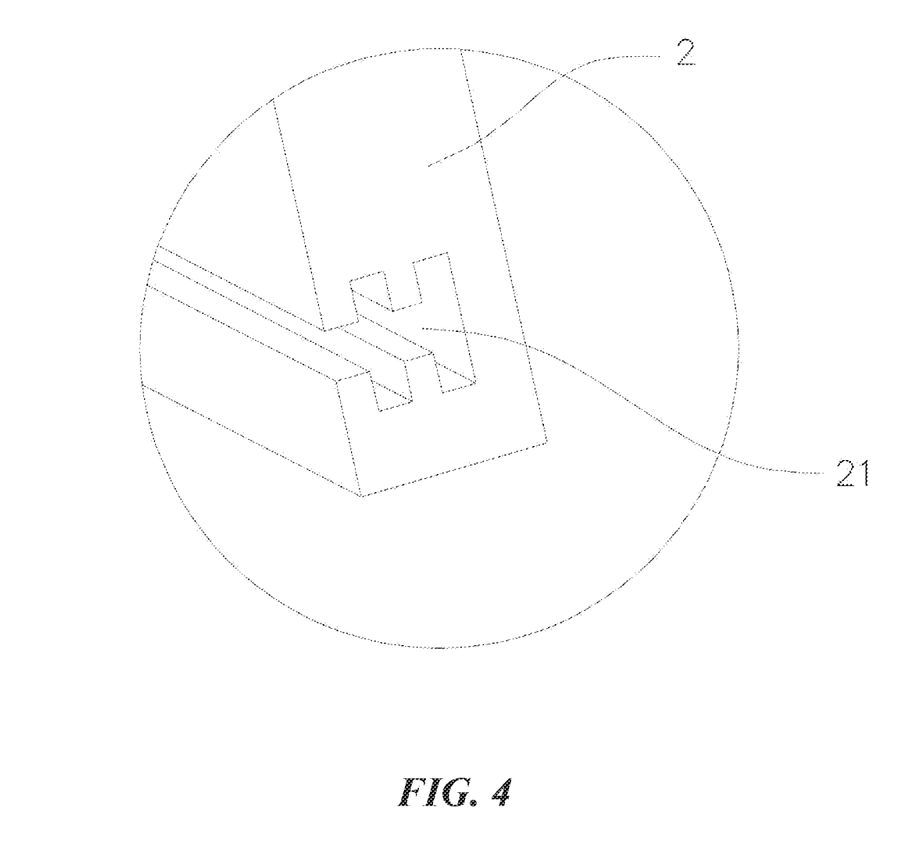
FIG. 4 is an enlarged schematic diagram of part B in FIG. 3.
Figure 5:
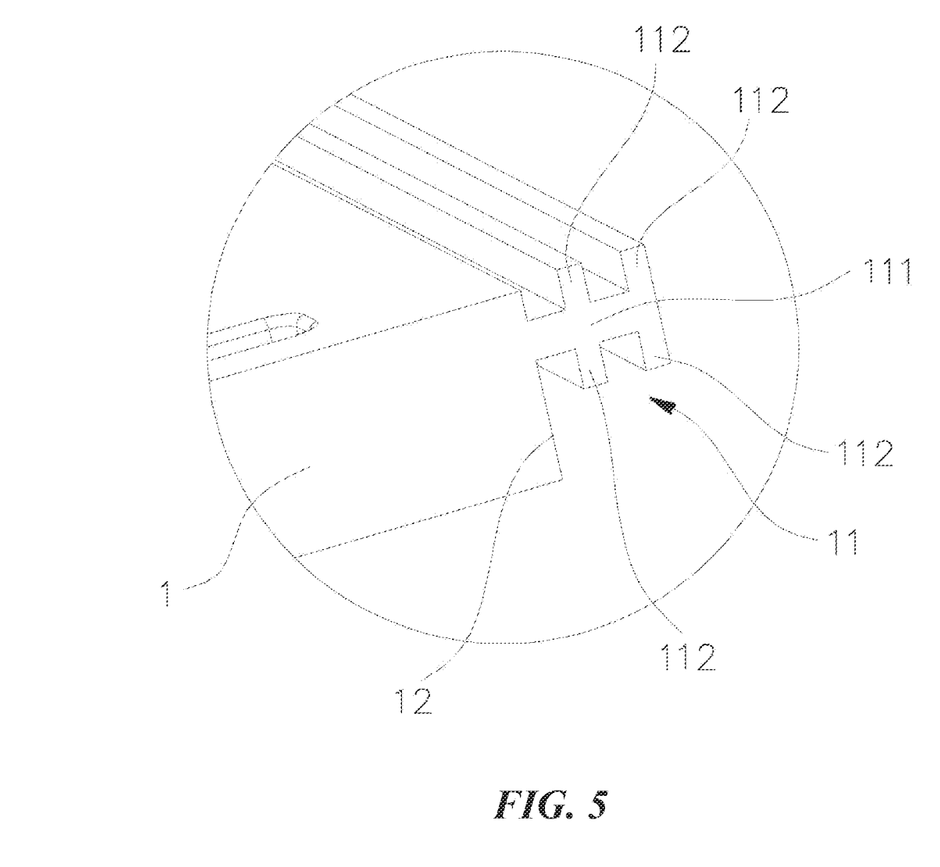
FIG. 5 is an enlarged schematic diagram of part C in FIG. 3.

As shown in FIG. 5, all the transversely extending arms 112 of this embodiment can adopt the same length. According to some embodiments, the length of the laterally extending arms 112 can be different according to different needs, which also has the advantages of stable structure and good waterproof performance.

In this embodiment, the first board 1 can be the bottom board of the cabinet, and the second board 2 can be the side board of the cabinet. When interlocking with each other, the first board 1 can be horizontally placed, and then the second board 2 can be placed in a vertical position. A user can backwardly insert the stripe-shaped rib 11 from the open end of the stripe-shaped groove 21 until the rear end of the stripe-shaped rib 11 and the closed end of the stripe-shaped groove 21 abut, thereby completing the coupling of the first board 1 and the second board 2.

According to some embodiments, the board coupling structure can also be applied to the connection or joint between other adjacent boards of the cabinet. For example, the first board 1 can be the right side board of the cabinet and the second board 2 can be the front side board of the cabinet, which can be interlocked with each other. By eliminating the need of any connection accessories, the present coupling structure can be convenient and quick. Correspondingly, the disassembly can be convenient as the coupling structure is screw-free. In addition, the coupling structure can be adopted between other boards or panels, such as the left side board and the front side board, the left side board and the rear side board.

Embodiment II

Figure 6:
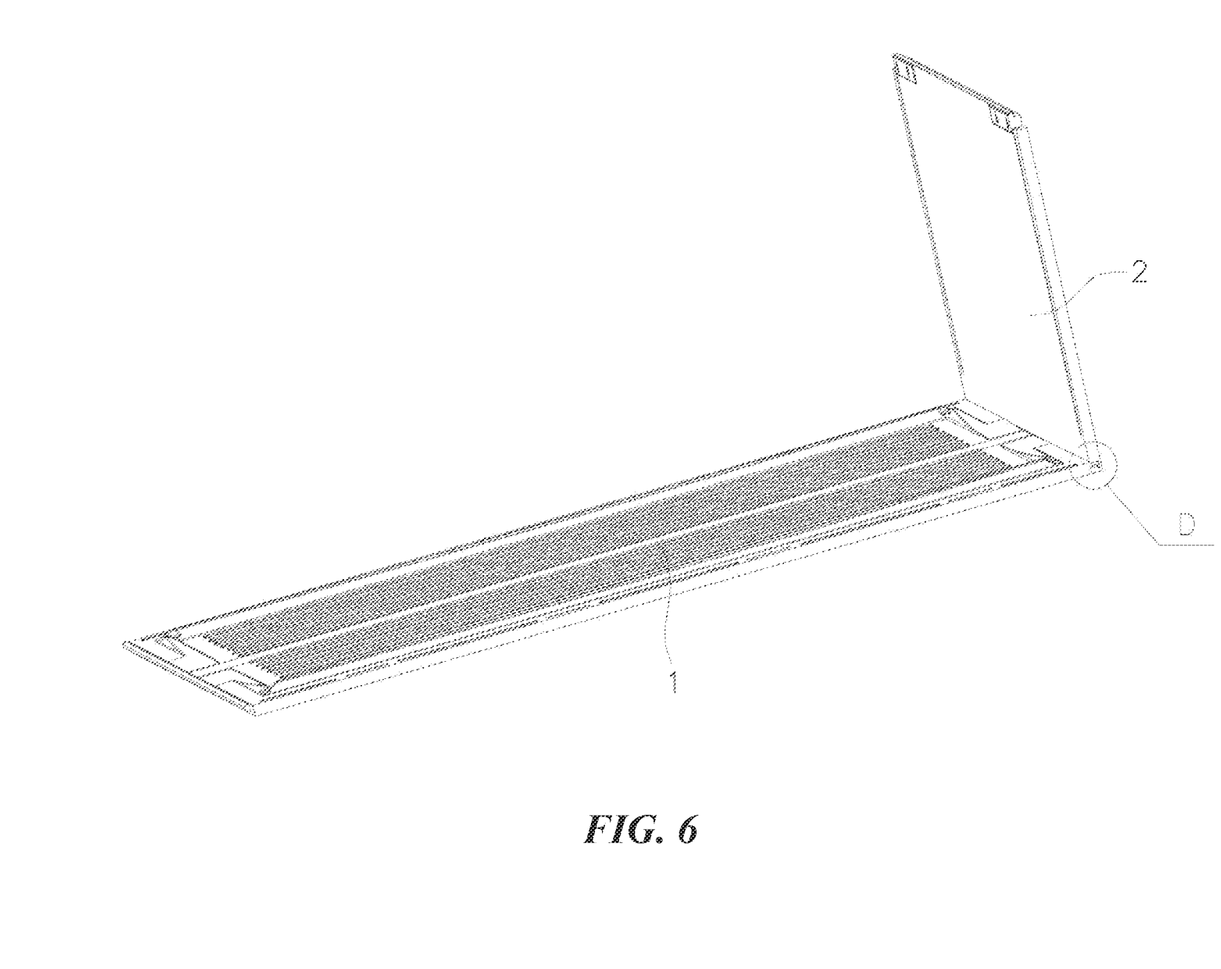
FIG. 6 is a schematic structural diagram of Embodiment II of the present subject matter.
Figure 7:
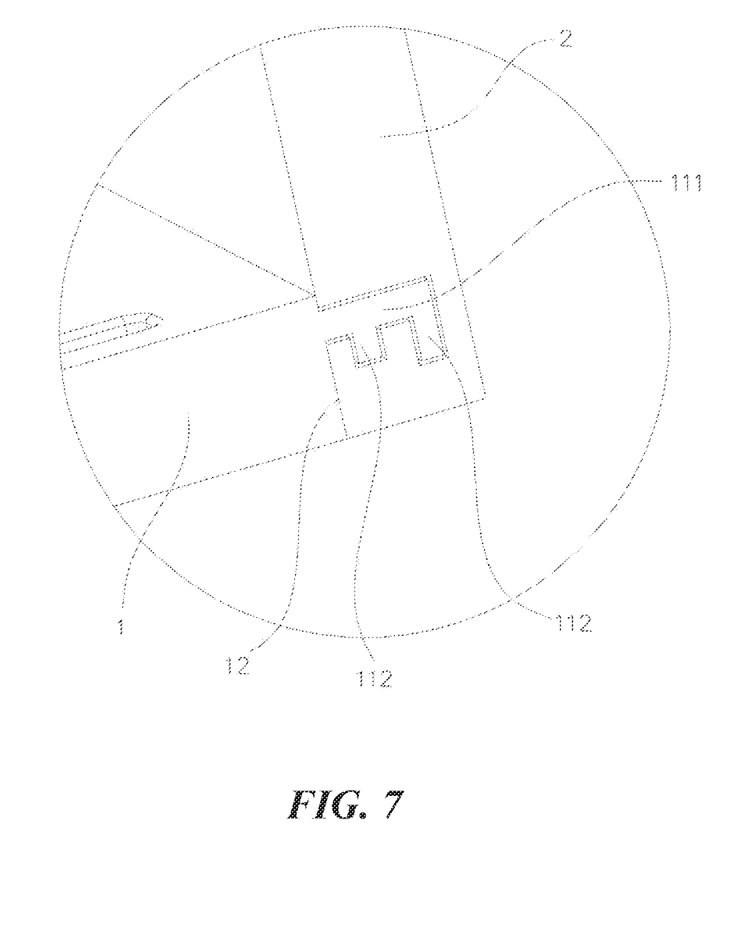
FIG. 7 is an enlarged schematic diagram of part D in FIG. 6.

As shown in FIGS. 6 and 7, in this embodiment, the transversely extending arm 112 can be provided on one side surface of the longitudinally extending arm 111, and the two transversely extending arms can be spaced out at predetermined intervals. The longitudinally extending arm 111 and the transversely extending arms 112 can jointly form the strip-shaped rib 11. As such, the cross-section of the strip-shaped rib 11 is F-shaped. In this embodiment, the length of the two transversely extending arms 112 may be the same or different. The F-shaped, plug-in coupling structure can have the advantage as described herein.

Embodiment III

Figure 8:
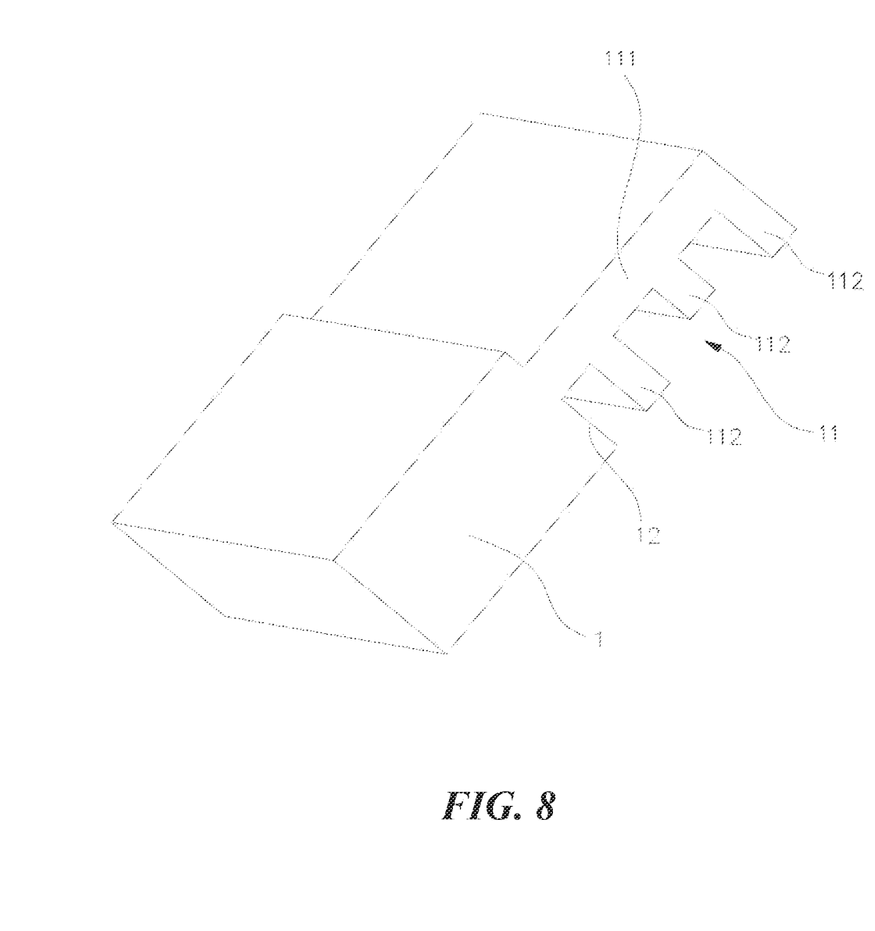
FIG. 8 is a schematic structural diagram of Embodiment III of the present subject matter.

As shown in FIG. 8, there are three transversely extending arms 112 in this embodiment that are spaced out at intervals. Compared with Embodiment II, it has one more transversely extending arm 112, which can further increase the contact area and improve the biting or engagement degree of the plug-in coupling structure. It can be more stable, reliable, and waterproof.

Embodiment IV

Figure 9:
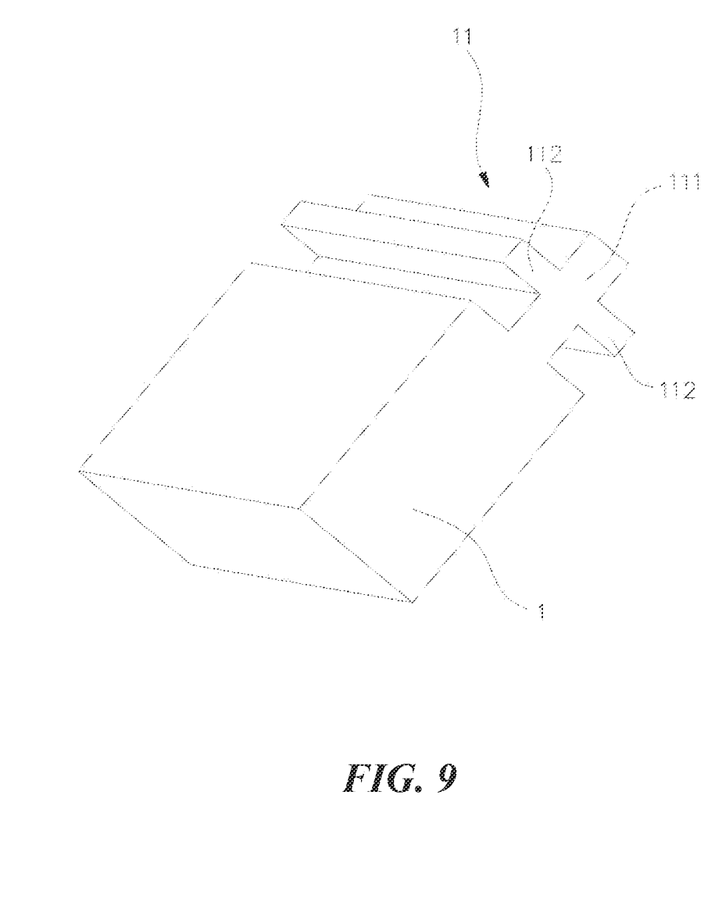
FIG. 9 is a schematic structural diagram of Embodiment IV of the present subject matter.

As shown in FIG. 9, the longitudinally extending arm 111 and the transversely extending arm 112 of this embodiment can jointly form a cross-shaped structure. Accordingly, the strip-shaped rib 11 is a cross-shaped structure that can be engaged with a cross-shaped groove in four different directions, thereby effectively improving the structural stability and waterproof performance.

Embodiment V

Figure 10:
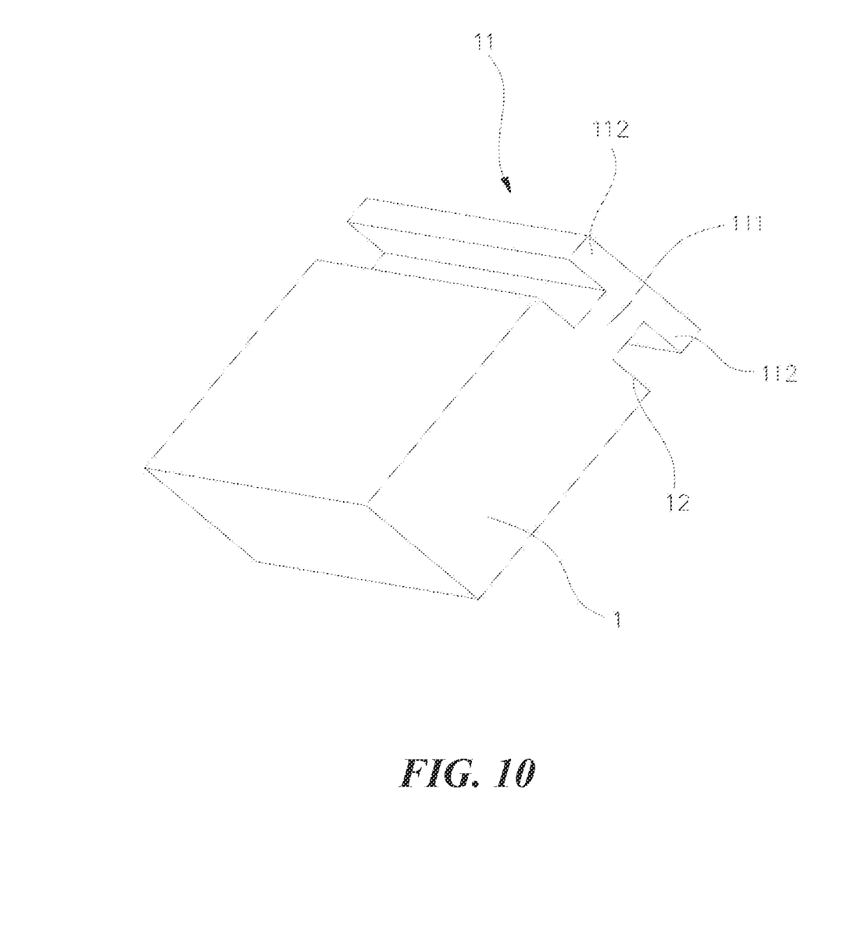
FIG. 10 is a schematic structural diagram of Embodiment V of the present subject matter.

As shown in FIG. 10, the longitudinally extending arm 111 and the transversely extending 112 of this embodiment can jointly form a T-shaped structure. Accordingly, the strip-shaped rib 11 is a T-shaped structure that can be engaged with a T-shaped groove, which is relatively easy to manufacture and the structural strength can still be optimized.

Embodiment VI

Figure 11:
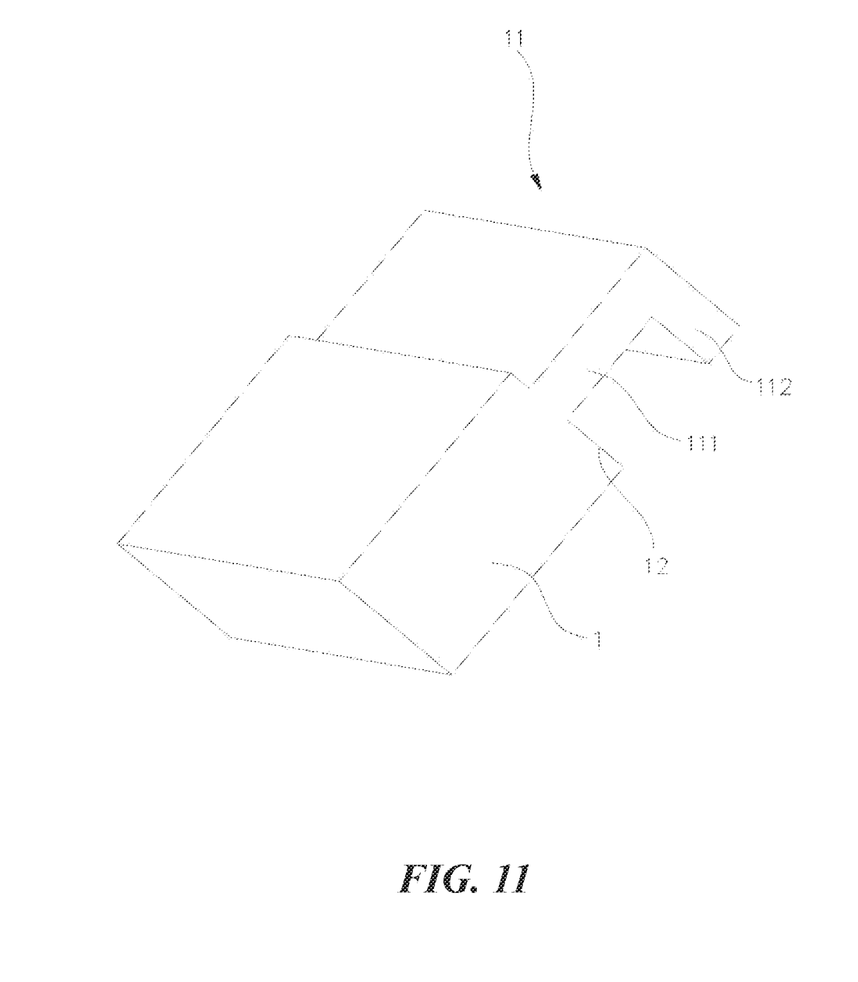
FIG. 11 is a schematic structural diagram of Embodiment VI of the present subject matter.

In FIG. 11, the longitudinally extending arm 111 and the laterally extending arm 112 of this embodiment can jointly form an L-shaped structure. Accordingly, the strip-shaped rib 11 is L-shaped. Even though the contact surface of the coupling structure is relatively small and the structural stability is relatively low, the manufacturing of the coupling structure is relatively easy, which can be suitable for the board connections that do not require high structural strength.

The above are only the preferred embodiments of the present subject matter. It should be pointed out that for those of ordinary skill in the art, without departing from the principle of the present subject matter, various modifications or improvements can be made to the present subject matter, such as in other applications. For example, the first board and the second board may not be perpendicular to each other, and the specific shape of the clamping portion is not limited to the disclosed shapes, and these are all considered to be within the protection scope of the present subject matter.

It is to be understood that even though numerous characteristics and advantages of various embodiments of the present subject matter have been set forth in the foregoing description, together with details of the structure and function of various embodiments of the subject matter, this disclosure is illustrative only. In some cases, certain subassemblies are only described in detail with one such embodiment. Nevertheless, it is recognized and intended that such subassemblies may be used in other embodiments of the subject matter. Practitioners skilled in the art will recognize many modifications and variations. Changes may be made in detail, especially matters of structure and management of parts within the principles of the embodiments of the present subject matter to the full extent indicated by the broad general meaning of the terms in which the appended claims are expressed.

Having disclosed exemplary embodiments and the best mode, modifications and variations may be made to the disclosed embodiments while remaining within the scope of the embodiments of the subject matter as defined by the following claims.

What is claimed is:

1. A board coupling structure, comprising:
a first board (1) and a second board (2) each being respectively formed with a strip-shaped rib (11) and a strip-shaped groove (21) that can be inserted into each other, the first board (1) and the second board (2) being only movable relative to each other in the insertion direction,
wherein the strip-shaped rib (11) comprises a longitudinally extending arm (111) with parallel sides extending outwards from a circumferential side (12) and at least two transversely extending arms (112) that are spaced apart and replicated on opposite sides of the longitudinally extending arm (111),
wherein the strip-shaped groove (21) is disposed on the inner side wall of the second board (2), and the shape of the strip-shaped groove (21) matches the shape of the strip-shaped rib (11); and
wherein one end of the strip-shaped groove (21) forms an opening in the insertion direction, and the other end is closed in the insertion direction.

2. The board coupling structure of claim 1, wherein the longitudinally extending arm (111) and the circumferential side (12) are perpendicular to each other, and the transversely extending arm (112) and the longitudinally extending arm (111) are perpendicular to each other.

3. The board coupling structure of claim 1, wherein the strip-shaped groove (21) is disposed near the edge of the second board (2) and along the length direction of the edge.

4. The board coupling structure of claim 1, wherein when the first board (1) and the second board (2) are interlocked, the first board (1) and the second board (2) are perpendicular to each other.

* * * * *